Dec. 10, 1957  M. W. CONNELL  2,815,882
SINGLE OPERATION NORMALLY CLOSED VALVE
Filed June 8, 1954
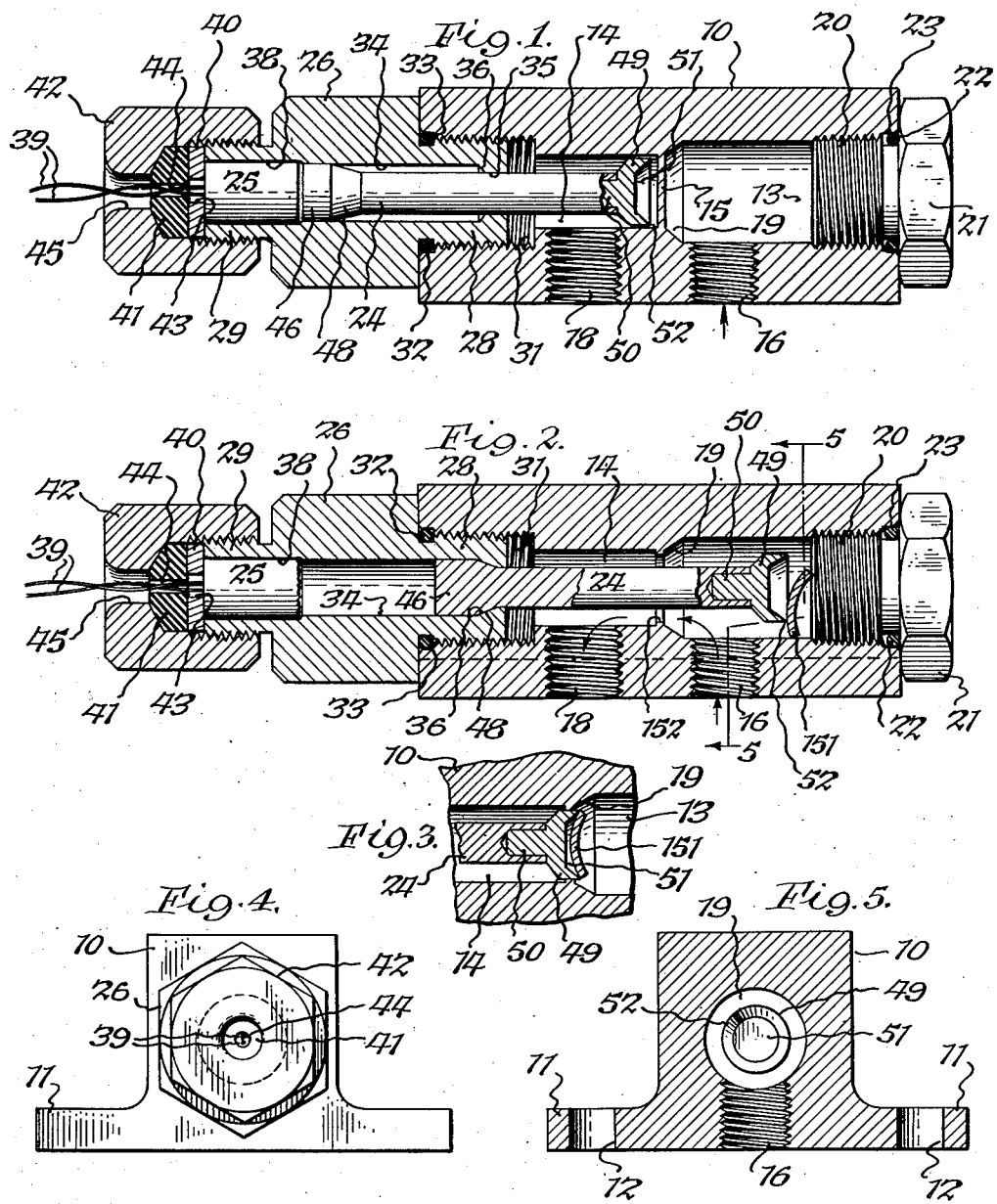
INVENTOR.
Maurice W. Connell
BY Popp and Sommer
ATTORNEYS

United States Patent Office 2,815,882
Patented Dec. 10, 1957

2,815,882

SINGLE OPERATION NORMALLY CLOSED VALVE

Maurice W. Connell, Williamsville, N. Y.

Application June 8, 1954, Serial No. 435,145

8 Claims. (Cl. 220—47)

This invention relates to a valve which is normally closed but which can be opened one time to allow the fluid being controlled by the valve to be released. This type of valve is herein referred to as a single operation normally closed valve.

The principal object of the present invention is to provide a single operation normally closed valve which is adapted to control fluid under high pressure, say in the order of several thousand pounds per square inch, and when closed effectively seals against the leakage of such a pressurized fluid and which can be quickly opened to permit the unobstructed flow of such fluid through the valve without leakage.

Another object is to provide such a single operation normally closed valve which may be operated electrically and therefore may be actuated from a remote point.

Another object is to provide such a single operation normally closed valve which requires a very low power input to operate it, such as that derived from a single 1½ volt dry cell battery.

A further object is to provide such a single operation normally closed valve which is light in weight and compact in design.

Other objects and advantages of the invention will be apparent from the following description and accompanying drawings in which:

Fig. 1 is a vertical central longitudinal sectional view through an electrically operated valve embodying the present invention and showing such valve in its normally closed condition.

Fig. 2 is a similar view but showing the condition of the valve after being opened.

Fig. 3 is a fragmentary longitudinal sectional view of the central portion of the valve shown in Figs. 1 and 2 and illustrating the action of the ram in punching out a portion of the wall of the valve body which separates the inlet and outlet compartments therein.

Fig. 4 is an elevational view of the left end of the valve shown in Fig. 1.

Fig. 5 is a vertical transverse sectional view of the valve and taken on the offset line 5—5, Fig. 2.

In accordance with the present invention there is provided a valve body 10 shown as an elongated rectangular block and having integral attaching flanges 11 extending outwardly from opposite sides of the body at the base thereof. These flanges 11 may each have one or more holes 12 to receive fastening devices such as screws or bolts (not shown) to attach the valve body to a supporting structure (not shown). The valve body may be constructed of a lightweight metal such as aluminum.

The elongated valve body 10 is shown as being internally formed to provide an inlet compartment 13 and an outlet compartment 14, these compartments being separated by a relatively thin wall or diaphragm 15, preferably formed integrally with the valve body. The inlet compartment 13 communicates with an inlet 16 opening into this compartment at a location adjacent the diaphragm 15, and the outlet compartment communicates with an outlet 18. The inlet 16 and outlet 18 are shown as internally threaded holes extending upwardly from the base of the valve body and opening into the respective compartment and are adapted to attachingly receive the ends of suitable externally threaded fittings (not shown) for conducting the fluid being controlled by the valve. It is to be understood that one or both of the inlet and outlet holes 16 and 18 respectively may be arranged in the sides or top of the valve body, if desired for a particular application of the valve.

The compartments 13 and 14 are preferably formed by drilling coaxially into the valve body 10 from opposite ends thereof so as to leave the integral wall or diaphragm 15 standing as a partition between these compartments. The compartments 13 and 14 are therefore cylindrical in cross-section and the diameter of the inlet compartment 13 is shown as being considerably larger than that for the outlet compartment, although this size relationship is not essential. A tapered section 19 to the immediate right of the diaphragm 15 serves as a reducing transition from the larger diameter of the inlet compartment 13 to the smaller diameter of the outlet compartment 14.

The outer end of the inlet compartment 13 is shown as closed by a threaded plug 20 which screws into the internally threaded end portion of the bore of the valve body 10 which forms this compartment. The plug 20 has an enlarged head 21 on its outer end and formed to receive a wrench for tightening the plug. In order to provide an effective seal against the leakage of fluid from the inlet compartment 13 past the threaded connection of the plug, a sealing ring 22 in the form of a Neoprene O-ring is shown as clamped by the plug head 21 against an annular shoulder 23 formed at the mouth of the bore of the valve body.

Electrically operated or excited means are provided for punching out the wall 15 when it is desired to open the valve by establishing communication between the inlet and outlet compartments 13 and 14 respectively. Such means comprises a ram 24 and an electrically ignitable primer 25 arranged within a ram cylinder 26. The ram cylinder 26 is shown as having at its inner end an axially projecting externally threaded reduced extension or neck 28 and at its outer end an axially projecting externally threaded reduced extension or neck 29, thus leaving an enlarged intermediate part. The threaded inner neck 28 screws into the internally threaded outer portion 31 of the bore which forms the outlet compartment 14 and serves as a plug therefor. Leakage past the threaded connection so provided is prevented by an annular sealing ring 32 such as a Neoprene O-ring which surrounds the neck 28 at the base thereof and is clamped against a shoulder 33 formed at the mouth of the threaded portion 31 of the valve body. The peripheral surface of the enlarged intermediate part of the ram cylinder 26 is preferably out of round so as to permit the application of a wrench thereto for tightening the cylinder against the valve body.

The ram cylinder 26 is provided with a bore 34 extending axially completely therethrough and arranged centrally of the inner and outer necks 28 and 29 respectively. The inner end of the bore 34 is of reduced diameter as indicated at 35 so as to closely engage the periphery of the ram 24, a tapered portion 36 of relatively short axial extent joining the main cylindrical portion of the bore 34 with its reduced inner cylindrical portion 35. The outer end portion of the bore 34 is slightly enlarged as indicated at 38 to provide a chamber in which the primer 25 is arranged. This primer 25 is of known construction and is in the form of a metal cartridge case containing a charge of combustible propellant ignited by a very small electrical input supplied through wires 39—

39. These wires may be in a circuit including a source of electrical energy such as a single 1½ volt dry cell battery (not shown).

The primer 25 is held in the chamber 38 by a metal disc 40, in turn backed up by a compressible plug 41 made of a suitable material such as neoprene, and an internally threaded cap which houses this disc and plug and is screwed onto the outer neck 29 of the ram cylinder 26. The disc 40, plug 41 and cap 42 have registered central holes, 43, 44, and 45 respectively, through which the wires 39 extend. The periphery of the cap 42 is out of round in shape to permit the application of a wrench for tightening the same. It will be noted that by tightening down the cap 42 the disc 40 is forced against the outer end face of the neck 29 and the compressible plug 41 is clamped between the shoulder on this cap and disc. When the firing mechanism is assembled the cap 42 is tightened down so as to compress the plug 41 thereby to contract the size of its hole 44 and more closely embrace the wires 39 and also to provide a larger area of backing for the disc 40. The plug 41 further serves to absorb some of the shock and recoil resulting from firing the primer 25.

Turning now to a consideration of the ram 24, the same is in the form of an elongated spindle extending through and engaging the contracted portion 35 of the bore of the ram cylinder 26 and has an enlarged cylindrical piston head 46 at its rear end which has a press fit in the cylindrical bore 34 of the ram cylinder. This head 46 is integrally jointed to the spindle portion of the ram by a frusto-conical section 48 having a relatively long axial extent and specifically has an angle of taper with respect to the longitudinal axis of the ram less than that for the taper 36 adjacent the inner end of the bore 34 in the ram cylinder 26. The advantage of such difference in taper is that when these two tapered surfaces engage upon firing the primer an effective seal is provided as will be later described herein.

The front end of the spindle portion of the ram 24 carries an enlarged punching head 49. This head 49 is shown as having an axially extending central cylindrical stem 50 projecting outwardly and press fitted into a recess formed in the front end of the ram spindle. The opposite and leading side of the punching head 49 is shown as having a frusto-conical recess 51 so as to leave a sharp annular axially projecting knife edge 52. The knife edge 52 is adapted to forcefully engage the wall or diaphragm 15 so as to punch out a slug 151 as depicted in Fig. 3.

From the foregoing it will be seen that a valve constructed in accordance with the present invention is normally closed. That is, the integral wall or diaphragm 15 separates the inlet and outlet compartments 13 and 14 respectively. This wall or diaphragm is designed so as to have the necessary thickness to prevent being blown out by the pressure of the fluid in the inlet compartment. The plug 20 suitably seals the other end of this compartment 13 and, of course, the fitting (not shown) which screws into the inlet hole 16 would be suitably sealed against the leakage of this pressurized fluid which in some applications of the valve might have a pressure of 4,000 pounds per square inch or even higher.

In the unfired condition of the valve shown in Fig. 1, no part of the ram 24 is arranged in the inlet compartment 13 and it is important to note that the knife edge 52 of the ram's punching head 49 is spaced slightly away from the opposing face of the wall or diaphragm 15. The purpose for this is that when the primer 25 is ignited by passing a small current through the wires 39, the pressurized gases resulting from combustion of the propellant can be fully utilized to overcome the static friction of the ram's piston head 46 which, as previously stated, has a press fit in the bore 34 of the ram cylinder 26, before the knife edge 52 contacts the wall or diaphragm 15. When the ram is moving the friction between its piston head 46 and the bore 34 is sliding friction which is easier to overcome than its initial static friction.

As the ram is forcefully driven into the inlet compartment 13 the knife edge 52 of its punching head 49 strikes the wall or diaphragm 15 with such a great impact acting over such a small annular area that this edge penetrates the wall or diaphragm and cuts out the slug 151 as shown in Fig. 3. If the inlet compartment 13 is completely filled with a liquid or a gas under high compression it will be seen that difficulties will be encountered if the slug as a flat member is attempted to be pushed into this compartment during the shearing action, this for the reason that the attempted movement of the slug into the compartment tends to further compress the medium already there present. A feature of the present invention is that the punching head 49 is so designed that as the annular marginal portion of the slug is being pushed into the inlet compartment the central portion of the slug is being pushed or dished outwardly by the pressure of the medium in this compartment into the cavity or recess 51 provided in the leading face of the punching head 49, thereby avoiding any tendency to change the pressure of the medium in the inlet compartment while the slug is being sheared out. In other words, the shearing force acts independently of the pressure on the inlet side of the valve. After the slug 151 has been completely cut out, the punching head 49 acts as a piston to carry the slug past the inner end of the inlet hole 16 and into the extreme right hand portion of the inlet compartment 13 where it is trapped or pocketed between the head 49 and plug 20, there being insufficient clearance between the periphery of this head and the surrounding wall of the bore 13 to permit the slug to escape.

It is an important feature of my invention that the slug 151 be struck out as one piece and be trapped to one side of the inlet hole 16 so that the slug will not pass down stream into the outlet compartment 14. The removal of the slug 151 from the wall or diaphragm 15 leaves a hole 152 (Fig. 2) which is larger in diameter than the spindle portion of the ram 24 thereby establishing an annular passage through which the fluid flows from the inlet compartment 13 into the outlet compartment 14 and thence out through the outlet hole 18, such flow being represented by arrowed lines in Fig. 2.

Another important feature of my invention is that the forward movement of the ram is stopped by the tapered portion 48 on the ram seating on the tapered inner face 36 of the end wall of the cylinder 26 and with such force that these engaging tapered surfaces are mutually upset and weld together as shown in Fig. 2. The ram and ram cylinder may be constructed of stainless steel. This provides an effective seal against the leakage of fluid at this place from the outlet compartment 14 and the pressure of fluid flowing into this compartment will not retract the ram.

Thus the present invention provides a single operation normally closed valve which is effectively sealed when either closed or opened. The valve has application where fast response, light weight, compact design and low input power are prime factors.

I claim:

1. A single operation normally closed valve, comprising a valve body having inlet and outlet compartments, a diaphragm separating said compartments, an inlet hole in said valve body and leading to said inlet compartment adjacent said diaphragm, that portion of said inlet compartment on the side of said inlet hole opposite from said diaphragm providing a pocket, an outlet hole in said valve body leading from said outlet compartment, a ram arranged within said outlet compartment for movement toward said diaphragm and having an elongated spindle portion and an enlarged punching head on the leading end thereof, said head having a peripheral cutting edge and adapted to punch a one-piece slug from said diaphragm which is carried forward by said head and trapped in said pocket, said spindle portion of said ram extending through the hole in said diaphragm left by said slug punched therefrom and the space between said spindle portion and hole providing a passage connecting said compartments, and means arranged to actuate said ram.

2. A valve as defined in claim 1 in which said peripheral cutting edge of said punching head of said ram is in the form of a forwardly projecting annular knife edge surrounding a recess which causes said slug to dish as it is punched out of said wall.

3. A single operation normally closed valve, comprising a valve body having inlet and outlet compartments, a diaphragm separating said compartments, and means arranged to punch a one-piece slug from said diaphragm and thereby establish communication between said compartments, said means comprising a ram cylinder on said valve body and having a bore and an end wall constituting one wall of said outlet compartment and the inner face of said end wall having a frusto-conical taper which enlarges inwardly of said cylinder to the diameter of said bore, a ram having a piston head at one end and movably arranged in said bore, an elongated spindle portion partially arranged in said bore and extending outwardly from said cylinder through said end wall thereof, a frusto-conical tapered portion connecting said piston head and the inner end of said spindle portion, and a punching head on the outer end of said spindle portion and adapted to penetrate said diaphragm, and means arranged to actuate said ram so that said tapered portion thereon engages said taper on said end wall with such force as to upset the contour of both such tapers and weld them together thereby to provide an effective seal between said end wall and ram.

4. A valve as defined in claim 3 in which said frusto-conical taper on said end wall has a shorter axial extent than that of said frusto-conical tapered portion of said ram.

5. A valve as defined in claim 3 in which said last mentioned means comprises an electrically ignitable charge of combustible propellant material.

6. A single operation normally closed valve, comprising a valve body having inlet and outlet compartments, a diaphragm separating said compartments, and means arranged to punch a one-piece slug from said diaphragm and thereby establish communication between said compartments, said means comprising a ram cylinder on said valve body and having a bore and an end wall constituting one wall of said outlet compartment, a ram having a piston head at one end and arranged in said bore remote from said end wall and having a press fit in said bore, an elongated spindle portion connected to said piston head and extending outwardly through said end wall into said outlet compartment and an enlarged punching head on the outer end of said spindle portion and having a peripheral cutting edge and adapted to punch a one-piece slug from said diaphragm thereby to establish communication between said compartments through the portion of the hole left by said slug unoccupied by said spindle portion, and an electrically ignitable charge of combustible propellant material for actuating said ram and arranged in said cylinder adjacent said piston head of said ram and on the side thereof opposite from said spindle portion thereof.

7. A single operation normally closed valve, comprising a valve body having inlet and outlet compartments, a diaphragm separating said compartments, and means arranged to punch a one-piece slug from said diaphragm and thereby establish communication between said compartments, said means comprising a ram cylinder having an end wall at one end constituting one wall of said outlet compartment and an externally threaded neck at its opposite end and also having coaxially arranged therein a chamber opening to said opposite end, a bore, and a hole in said end wall; a ram partially arranged in said cylinder and including a piston head at one end arranged in said bore adjacent said chamber, a spindle portion connected at one end to said piston head and extending through said hole into said outlet compartment, and an enlarged punching head on the outer end of said spindle portion and having a peripheral cutting edge and adapted to punch a one-piece slug from said diaphragm; an electrically ignitable primer arranged in said chamber for actuating said ram; means arranged to hold said primer in said chamber and including a rigid disk arranged against the outer end face of said neck, a plug of compressible material arranged against the outer side of said disk and an internally threaded cap arranged on said threaded neck and housing said plug and disk and compressing said plug; said cap, plug and disk having registered holes, and electrical wires extending through said holes and operatively connected to said primer.

8. A single operation normally closed valve, comprising a valve body having recesses in opposite ends thereof and a transverse diaphragm wall separating said recesses, means closing the outer end of one of said recesses thereby to form an inlet compartment, an inlet for said inlet compartment and leading thereto adjacent said diaphragm wall, a cylinder mounted on said body and having an end wall with a hole therein arranged adjacent the outer end of the other of said recesses thereby to form an outlet compartment, an outlet for said outlet compartment, a ram partially arranged in said cylinder and having a spindle portion projecting outwardly through said hole into said outlet compartment and toward said diaphragm wall, an enlarged punching head on the outer end of said spindle portion and having a peripheral cutting edge and adapted to punch a one-piece slug from said diaphragm wall which is carried forward by said head and trapped in said inlet compartment adjacent said outer end thereof, and an electrically ignitable charge of combustible propellant material arranged in said cylinder for actuating said ram.

References Cited in the file of this patent
UNITED STATES PATENTS

| | | |
|---|---|---|
| 1,022,301 | Campbell | Apr. 2, 1912 |
| 2,370,870 | McKeaque | Mar. 6, 1945 |
| 2,515,068 | Young | July 11, 1950 |
| 2,552,110 | Otis | May 8, 1951 |
| 2,557,120 | Knoblock | June 19, 1951 |